United States Patent [19]

Shimada et al.

[11] Patent Number: 5,207,483
[45] Date of Patent: May 4, 1993

[54] ANTI-SKID CONTROL SYSTEM FOR AUTOMOTIVE VEHICLE

[75] Inventors: Kousaku Shimada, Katsuta; Shigeru Horikoshi, Mito; Tatsuhiko Monji; Hayato Sugawara, both of Katsuta, all of Japan

[73] Assignees: Hitachi, Ltd., Tokyo; Hitachi Automotive Engineering Co., Ltd., Ibaraki, both of Japan

[21] Appl. No.: 854,831

[22] Filed: Mar. 20, 1992

[30] Foreign Application Priority Data

Mar. 20, 1991 [JP] Japan .................. 3-056294

[51] Int. Cl.⁵ .............................................. B60T 8/32
[52] U.S. Cl. .................................. 303/100; 303/102; 303/111; 188/181 A
[58] Field of Search ............... 303/100, 102, 103, 111, 303/105, 104, 106, 108, 110; 188/181 R, 181 C, 181 A; 364/426.02; 180/244, 140, 197

[56] References Cited

U.S. PATENT DOCUMENTS 4,489,382 12/1984 Jonner et al. .................. 303/110 X

OTHER PUBLICATIONS

JP-A-1-208256, Abstract, Aug. 22, 1989, Sugitani.
JP-A-63-106168, Abstract, May 11, 1988, Onoki.
JP-A-64-16912, Abstract, Jan. 20, 1989, Kumasaka.
JP-A-64-1906, Abstract, Jan. 6, 1989, Araki.

*Primary Examiner*—Douglas C. Butler
*Attorney, Agent, or Firm*—Antonelli, Terry, Stout & Kraus

[57] ABSTRACT

The invention relates to an anti-skid control system for an automotive vehicle, which includes devices provided independently for respective wheels of the vehicle and for controlling the brake fluid pressure of respective wheels, device for detecting a vehicle speed and a rotation speed of the wheel and deriving slip ratio on the wheel on the basis of the detected values, device for detecting actual yawing angular acceleration on the vehicle, device for setting a target value of the slip ratio on the wheel based on the yawing angular acceleration for each wheel independently of the other, and control signal unit for providing the control signal to the brake fluid pressure controlling unit so as to adjust the derived slip ratio toward the target value.

21 Claims, 13 Drawing Sheets

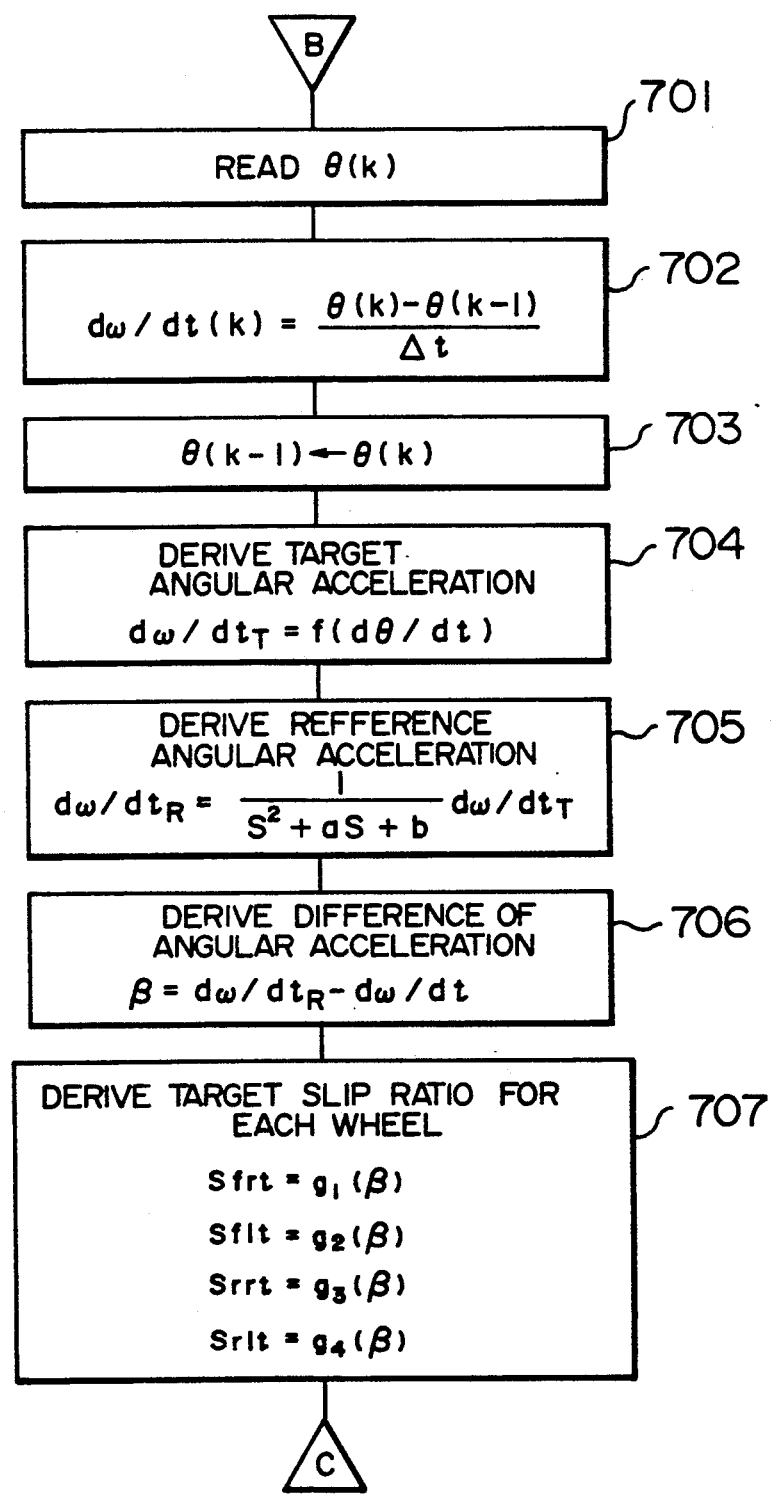

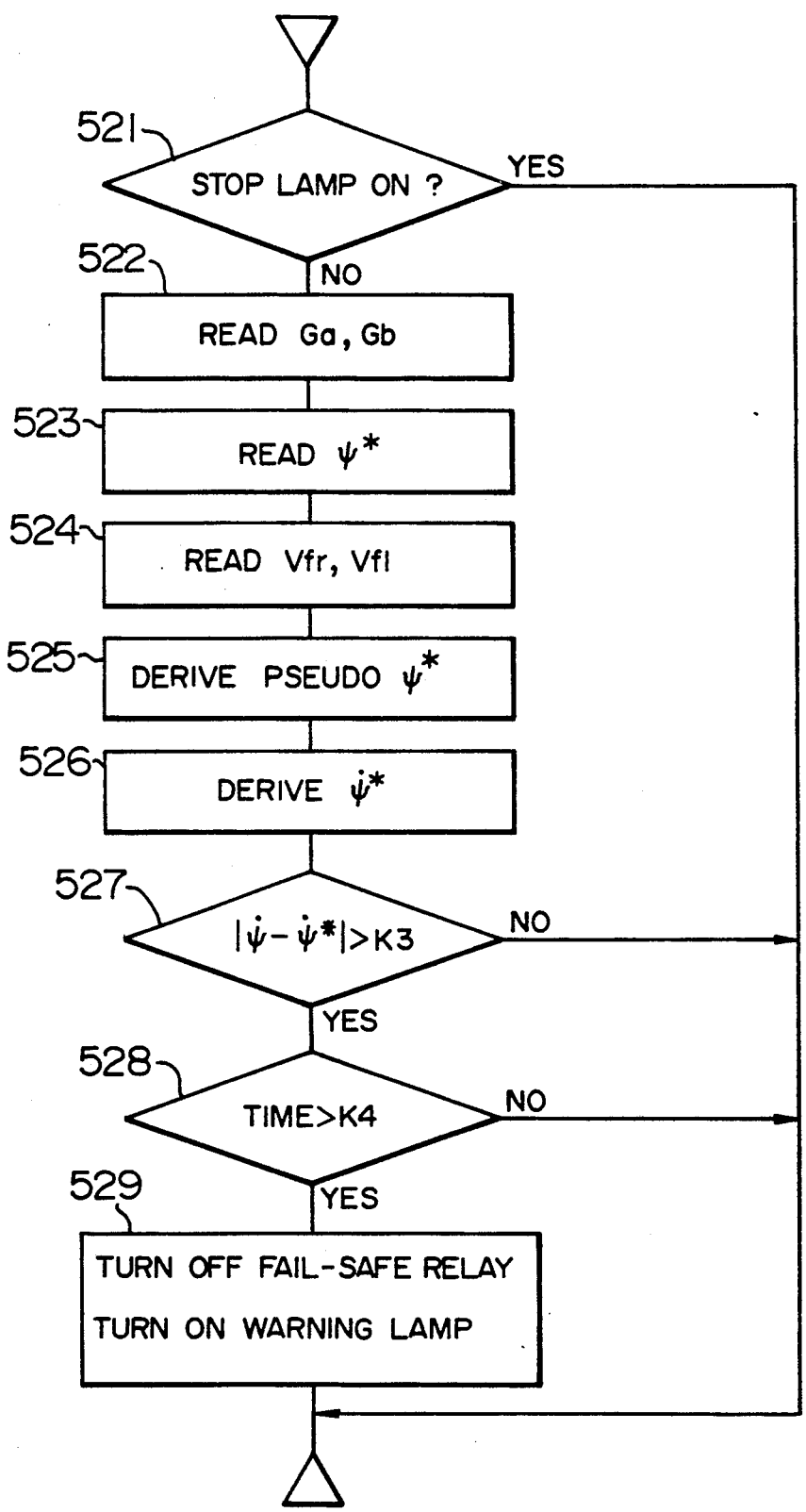

ANTI-SKID CONTROL SYSTEM FOR AUTOMOTIVE VEHICLE

BACKGROUND OF THE INVENTION

The present invention relates to an anti-skid control system for a brake system in a vehicle, such as an automotive vehicle. More specifically, the invention relates to an anti-skid control system and a control method thereof, which can prevent a vehicle body from falling into spinning state due to difference of friction coefficient of left and right wheels relative to the road surface, and so forth.

Conventional anti-skid control system includes a valve for decreasing or holding hydraulic braking pressure on a road surface having low friction coefficient, particularly on a snowy road, icy road or so forth, for preventing wheels from locking and whereby assure stability during braking without causing expansion of braking distance.

However, such conventional system is not effective for assuring driving stability and braking efficiency at possible all road surface condition. Particularly, if there is a difference of the friction coefficients of the road surface at the left and the right wheels of the vehicle, and if control is performed to maintain the wheel slippage at the left and right wheels uniform, a difference of magnitude of the braking force applied to the left and right wheels is caused to generate yawing moment on the vehicle due to unbalance of the braking force.

In the conventional anti-skid control system, on the road surface condition having different friction coefficients, i.e. split $\mu$ road, select-low is performed to make the braking pressures coincidence with the braking pressure of one of the rear wheels which is going to cause locking, in order to obtain enhanced stability. In such select-low control, braking pressure becomes uniform at relatively low pressure level for all wheels, possibly too small, and thus sacrifices braking distance.

Furthermore, for example, in Japanese Unexamined Patent Publication JP-A-1-208256, there have been proposed an advanced control, in which a target slip ratio of the rear wheels is lowered at the occurrence of unstable condition with high yawing rate, and conversely, a target slip ratio of the front wheels is lowered at the occurrence of insufficient controllability of steering to increase the cornering force.

On the other hand, in Japanese Unexamined Patent Publication JP-A-63-106168, there is proposed a system for setting the target wheel slippage for left and right wheels at the split $\mu$ road.

However, the above-mentioned prior art sacrifices either the braking efficiency of the brake system or the stability of the vehicle and has not been achieved both of the braking efficiency and the vehicular stability. Namely, control is selected to give importance for the braking performance or the stability performance depending upon the vehicular braking condition.

Even when control is performed giving importance for the stability, it has not been performed the action for canceling unbalance of the left and right braking force on the split $\mu$ road, in which the friction coefficients at the left and right wheels are difference. Therefore, such control merely reduce the magnitude of unbalance in the braking force.

Therefore, it is an object of the present to provide an anti-skid control system which fundamentally cancels the unbalance of the braking force even on the split $\mu$ road and thus achieves both of the stability and braking efficiency even on the split $\mu$ road.

SUMMARY OF THE INVENTION

An anti-skid control system for an automotive vehicle, according to the present invention, includes a device provided for each of vehicular wheels independently of the other and controlling brake fluid pressure for each wheel, a device for detecting a vehicle speed and a wheel speed and deriving a slip ratio of the wheel based thereon, a device for detecting an actual yawing angular acceleration of the vehicle, a device for setting target values of slip ratios for left and right wheels independently of the other on the basis of the yawing angular acceleration, and a control signal generator device for providing control signals for the brake fluid pressure control device so that the detected slip ratios of the wheel become coincidence with the target value.

BRIEF DESCRIPTION OF THE DRAWINGS

FIG. 7 is a flowchart for calculation of target slip ratio;

FIG. 15 is a flowchart showing a process for fail-monitoring.

DESCRIPTION OF THE PREFERRED EMBODIMENT

When a vehicle enters into a split $\mu$ road which has a plurality of mutually different friction coefficients $\mu$, the vehicle can travel with difference $\mu$ values at left and right wheels. If brake is applied on such road surface condition, yawing moment can be generated on the vehicle due to unbalance of the braking force at the left and right wheels at the initial stage of braking operation and the front end of the vehicle is inclined to be directed to toward the road surface having higher μ value.

The anti-skid control system according to the present invention detects yawing angular acceleration of the vehicle and adjust slip ratios at the left and right wheels to reduce the yawing angular acceleration.

In the preferred embodiment of the anti-skid control system according to the invention, a target yawing angular acceleration generated on the basis of steering speed is subtracted from the detected yawing angular acceleration to obtain an acceleration component of a yawing moment purely depending upon the road surface condition. Unnecessary yawing due to the road surface condition is reduced by adjusting the slip ratios at the left and right wheels. In adjustment of the slip ratios, the target slip ratios for all wheels are set so that the friction coefficients μ at the front wheels become substantially uniform. In the shown embodiment, the target slip ratios are stored in a map.

On the other hand, in another embodiment of the anti-skid control system according to the invention, two acceleration sensors are arranged in spaced apart relationship on the longitudinal or lateral axis so as to monitor the yawing angular acceleration.

In further embodiment of the present invention, the yawing angular accelerations are detected by two different ways so that if both of the detected yawing angular accelerations are maintained at values exceeding a predetermined value for a predetermined period, judgement is made that failure is caused on the yawing angular acceleration detecting device to produce an alarm or to terminate slip ratio control.

The preferred embodiments of the anti-skid control system will be discussed herebelow with reference to the accompanying drawings.

Figure 1:
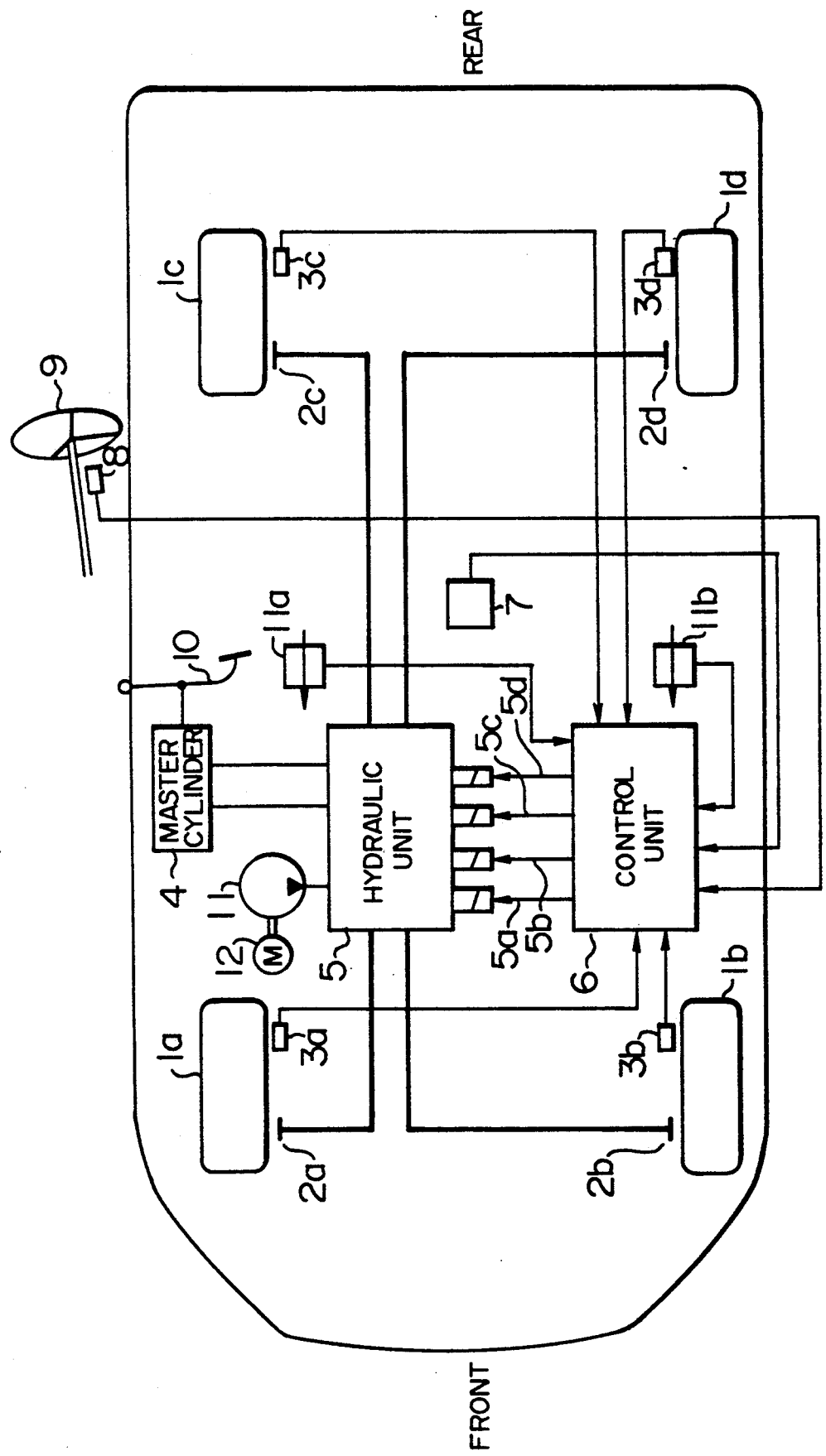
FIG. 1 is a diagrammatic illustration of an anti-skid control system according to the present invention.

FIG. 1 shows overall construction of one embodiment of the anti-skid control system according to the present invention. Wheel cylinders $2a$, $2b$, $2c$ and $2d$ are provided for respective of a front right wheel $1a$, a front left wheel $1b$, a rear right wheel $1c$ and a rear left wheel $1d$ for transmitting brake fluid pressure therefor. Wheel speed sensors $3a$ to $3d$ are also provided for respective of wheels $1a$ to $1d$. The brake fluid pressure to be built in the wheel cylinders $2a$ to $2d$ is initially generated in a master cylinder 4 in response to depression of a brake pedal 10, then transmitted to a hydraulic unit 5 and transmitted to respective of the wheel cylinders via the hydraulic unit 5.

The hydraulic unit 5 is provided with electromagnetic valves $5a$ to $5d$ which are variable of states between conducting state, holding state and releasing state in transmission of the brake fluid pressure for respective of the wheels $1a$ to $1d$. The electromagnetic valves $5a$ to $5d$ are operated by control signals from a control unit 6 which includes a microcomputer. On the other hand, as sensors for providing inputs for the control unit 6, the wheel speed sensors $3a$ to $3d$, a steering angle sensor 8 for monitoring angular position of a steering wheel 9, an angular velocity sensor 7 for detecting a yawing rate on the vehicle, acceleration sensors $11a$ and $11b$ for detecting longitudinal acceleration and lateral acceleration exerted on the vehicle are employed. Namely, as set forth above, the control unit 6 derives the control signals for driving the electromagnetic valves $5a$ to $5d$.

The electromagnetic valves $5a$ to $5d$ are three-way valves so that the fluid pressure build-up in the master cylinder 4 is transmitted as is when a control current for the valves is OFF, the fluid communication is blocked for holding the brake fluid pressure in the wheel cylinders $2a$ to $2d$ constant when the control current Ia (A) is applied for the valves, and the working fluid in the wheel cylinders $2a$ to $2d$ are drained for reducing the brake fluid pressure when the control current Ib (A) is applied for the valves.

With respect to the anti-skid control system set forth above, basic control operation will be discussed herebelow.

Conventionally, there have been proposed and reported various systems to perform control operations in the anti-skid control systems, as a basic operation, when respective of wheel speeds obtained through the wheel speed sensors are $V_{fr}$: wheel speed at the front right wheel,
$V_{fl}$: Wheel speed at the front left wheel,
$V_{rr}$: wheel speed at the rear right wheel, and
$V_{rl}$: Wheel speed at the rear left wheel, slip ratios at respective wheel can be expressed by:
$S_{fr}=(V-V_{fr})/V$: slip ratio at the front right wheel,
$S_{fl}=(V-V_{fl})/V$: slip ratio at the front left wheel,
$S_{rr}=(V-V_{rr})/V$: slip ratio at the rear right wheel, and
$S_{rl}=(V-V_{rl})/V$: slip ratio at the rear left wheel.

Figure 5:
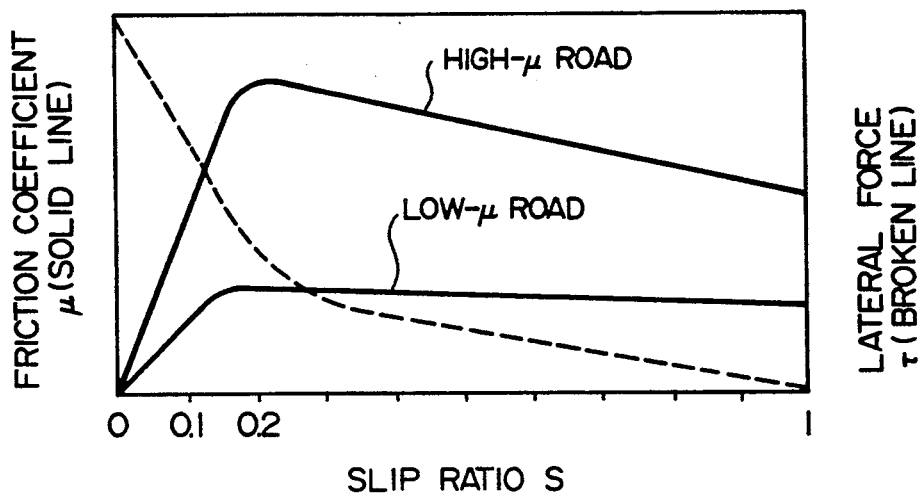
FIG. 5 is a graph showing $\mu$-s characteristics of a brake system.

Here, FIG. 5 shows well known relationship between the friction coefficient μ and the wheel slip ratio S, which is called as μ-S characteristics. So as to obtain maximum friction coefficient μ, the slip ratio S at each wheel is set in the vicinity of 0.2. When the slip ratios at the wheels are excessive, then the electromagnetic valves $5a$ to $5d$ are operated to reduce the brake fluid pressure in respective of the wheel cylinders $2a$ to $2d$. As a result, the wheel speed is increased to gradually approach to the vehicle body speed to reduce the slip ratio.

On the other hand, when slip ratios are substantially small value, the brake fluid pressure in the wheel cylinders $2a$ to $2d$ are increased to apply the increased brake torque for the wheel to increase the slip ratios.

By repeating the foregoing process to vary the brake fluid pressure in the wheel cylinders $2a$ to $2d$, the slip ratios at the wheels are approached toward the predetermined value to obtain optimum braking force. In addition, by the process set forth above, braking stability can be improved without causing reduction of the lateral force which contributes for driving stability.

However, the foregoing operation is designed in terms of the equal road surface conditions on respective of four wheels. Namely, when braking force at respective of the wheels $1a$ to $1d$ are $F_{fr}$: braking force at front right wheel;
$F_{fl}$: braking force at front left wheel;
$F_{rr}$: braking force at rear right wheel;
$F_{rl}$: braking force at rear left wheel;
and if there is no difference between vertical loads $W_f$ and $W_r$ at the left and right wheels $1a$ to $1d$ and the friction coefficients μ at respective wheels are the same, the following equations can be established $$F_{fl}=F_{fr}=\mu \cdot W_f$$

$$F_{rl}=F_{rr}=\mu \cdot W_r$$

In this case, since there is no difference of the braking force at the left and right wheels, no moment about the gravity center of the vehicle (spinning moment) will not be generated. Therefore, the vehicular driving stability can be obtained.

Figure 4:
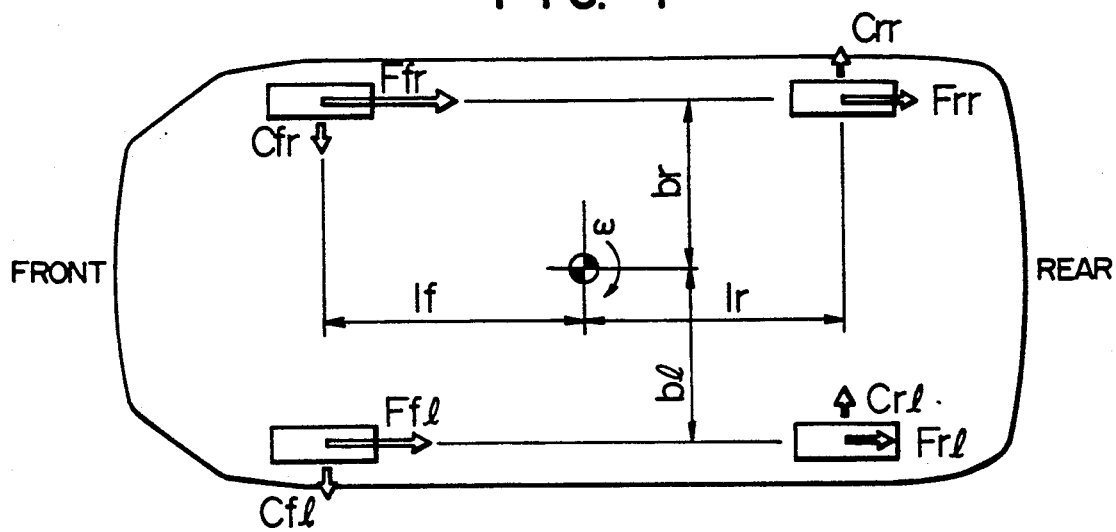
FIG. 4 is an explanatory illustration showing generation of yawing moment.

On the other hand, if there is a difference in at the left and rear wheels and summing that the road surface $\mu$ at the right side is higher than that at the left side, i.e. $\mu_r > \mu_l$, which condition is illustrated in FIG. 4, the following formulae can be established:

$$F_{fr} = \mu_r W_f > F_{fl} = \mu_l W_f$$

$$F_{rr} = \mu_r W_r > F_{rl} = \mu_l W_r$$

In addition, since the load $W_f$ at the front wheel is greater than the load $W_r$ at the rear wheel during braking operation, $F_{fr} > F_{rr}$, $F_{fl} > F_{rl}$ are established. Accordingly, about the gravity center, the yawing moment which can be expressed by:

$$Mb = b_r(F_{fr} + F_{rr}) - b_l(F_{fl} + F_{rl}) - l_f(C_{fr} + C_{fl}) - l_r(C_{rr} + C_{rl})$$

is generated. Here, $C_{fr}$, $C_{fl}$, $C_{rr}$ and $C_{rl}$ are cornering force generated at respective of the front right, front left, rear right and rear left wheels. The maximum value of each of the cornering force is smaller than or equal to the lateral force in FIG. 5.

On the other hand, when $$Mb = b_r(F_{fr} + F_{rr}) - b_l(F_{fl} + F_{rl}) < l_f(C_{fr} + C_{fl}) - l_r(C_{rr} + C_{rl})$$

the moment to be generated by the braking force difference at the left and right wheels is canceled by the lateral forces of the tires. Therefore, actual moment, i.e. yawing, will not be caused on the vehicle.

However, according to increasing of the difference of $\mu$ at the left and right wheels, the formula is changed to be $$Mb = b_r(F_{fr} + F_{rr}) - b_l(F_{fl} + F_{rl}) > l_f(C_{fr} + C_{fl}) - l_r(C_{rr} + C_{rl})$$

Then, yawing is caused on the vehicle.

This yawing motion is induced by the road condition stead of the driver's steering operation and thus against the will of the driver. Furthermore, such yawing motion is not expected by the driver, abrupt yawing motion can make it impossible to perform steering operation in response thereto.

Therefore, in the present invention, the yawing moment is detected as the yawing angular acceleration for positively canceling unbalance of the braking force to make it uniform by adjusting the target slip ratio at the left and right wheels.

Namely, there is one of the method for detecting yawing angular acceleration, in which an angular velocity sensor is employed. In this method, the angular velocity sensor 7 which is mounted on the vehicle body, measures yaw rate $\omega$. The measured yaw rate $\omega$ is differentiated to obtain the yawing angular acceleration $d\omega/dt$.

Figure 3A:
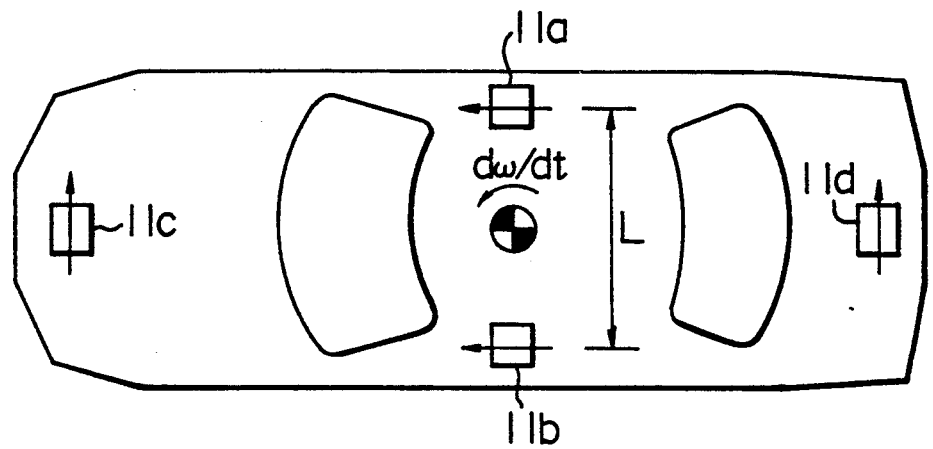
FIGS. 3A and 3B are illustrations showing arrangement of acceleration sensors.
Figure 3B:
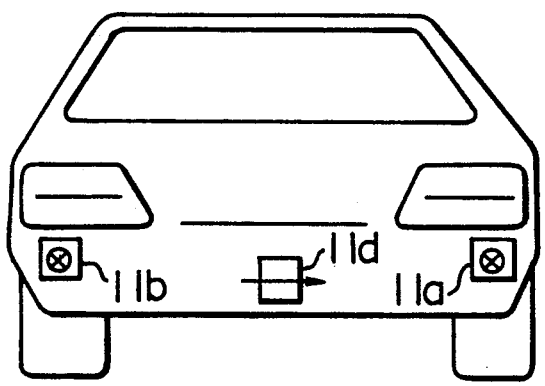

In another method for detecting the yawing angular acceleration, acceleration sensors are used. For instance, as shown in FIGS. 3A and 3B, pairs of acceleration sensors 11a, 11b and 11c, 11d are employed for measuring accelerations. Based on the measured acceleration, an error signal representative of a difference of the measured values of the acceleration, is derived for use in the calculation of the yawing angular acceleration. Example of derivation of the yawing angular acceleration in this way will be discussed herebelow in terms of the acceleration sensors 11a and 11b used for measuring the accelerations. It is assumed that the acceleration sensor 11a is exerted the acceleration in the positive direction (the direction shown by the arrow) and the acceleration sensor 11b is exerted the acceleration in the negative direction (the direction opposite to the direction shown by the arrow). Then, the generated acceleration can be expressed by the following equation:

$$G(d\omega/dt) = (L/2) \times d\omega/dt \quad (1)$$

wherein $G(d\omega/dt)$ is an acceleration generated by $d\omega/dt$;

L is a distance between the acceleration sensors 11a and 11b;

$d\omega/dt$ is a yawing angular acceleration

Since the acceleration detected by respective of the acceleration sensors practically includes the component of the longitudinal acceleration $G_B$ at the gravity center, the acceleration can be expressed by:

$$G_1 = G_B + (L/2) \times d\omega/dt$$

where $G_1$ is an acceleration at the measuring point where the acceleration sensor 11a is provided;

$G_B$ is a longitudinal acceleration at the gravity center.

On the other hand, at the measuring point where the acceleration sensor 11b is provided, only the sign of the second component becomes reversed and thus expressed by:

$$G_2 = G_B - (L/2) \times d\omega/dt$$

From these, the yawing acceleration $d\omega/dt$ can be derived using the measured values $G_1$ and $G_2$ through the following equations:

$$d\omega/dt = (G_1 - G_2)/L \quad (2)$$

Namely, by calculation of the foregoing equation (2), the yawing angular acceleration can be derived.

Figure 6A:
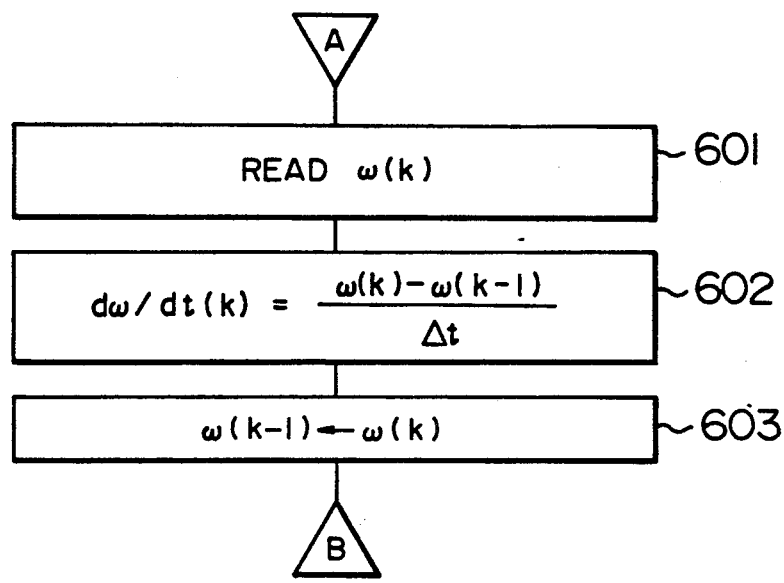
FIGS. 6A and 6B are flowchart of a routine for calculating yawing angular acceleration.
Figure 6B:
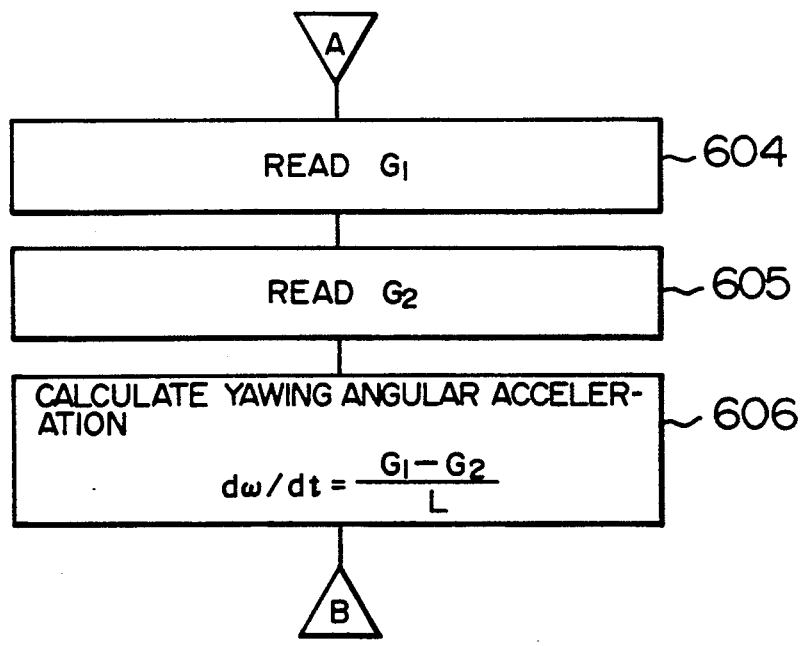

The above-mentioned two methods for calculating the yawing angular acceleration are implemented by program in the control unit 6. The process of the program is illustrated in FIGS. 6A and 6B. In the practical implementation of the anti-skid control system, either one of the routines of calculation for the yawing acceleration may be selected for use.

Next, with reference to the operational block diagram of FIG. 9, the operation will be discussed. As set forth above, the detected yawing angular acceleration $d\omega/dt$ includes yawing moment component generated by the steering operation. Therefore, a difference of the detecting yawing acceleration $d\omega/dt$ and a target yawing acceleration $d\omega/dt_R$ which is derived on the basis of a steering angular velocity, is calculated for deriving the yawing angular acceleration due to steering operation. In general, it is known that the secondary delay component of the steering angular velocity $d\theta/dt$ is proportional to the yawing angular acceleration generated by the steering operation. Therefore, by generating proportional component at a block 91 and the secondary delay component at a block 92 based on the steering angular velocity $d\theta/dt$, the target yawing angular acceleration $d\omega/dt_R$ can be generated.

The target yawing angular acceleration $d\omega/dt_R$ thus generated is compared with the yawing angular acceleration dω/dt of the vehicle body which is generated in the manner illustrated in either of FIG. 6A or 6B, to derive a difference β.

Figure 2A:
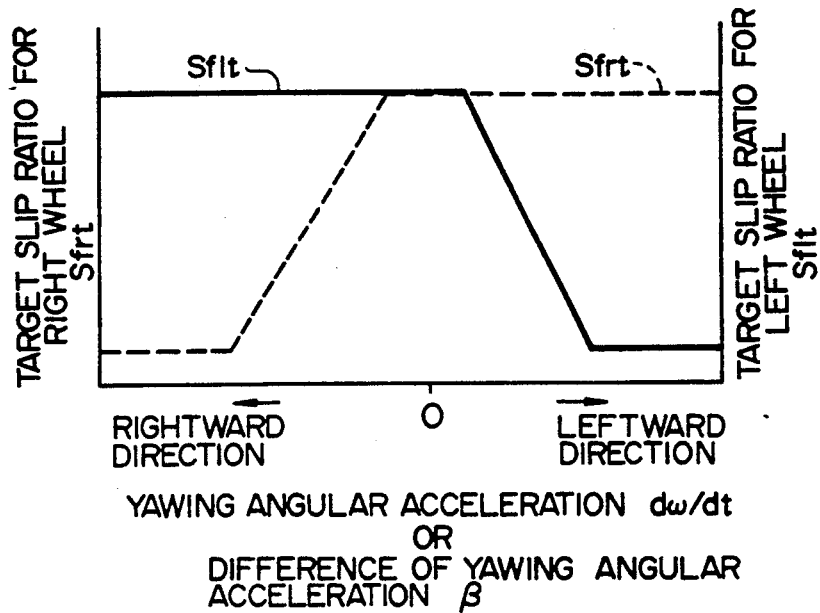
FIGS. 2A and 2B are graphs showing one example of a table for target slip ratio in the anti-skid control system of FIG. 1.
Figure 2B:
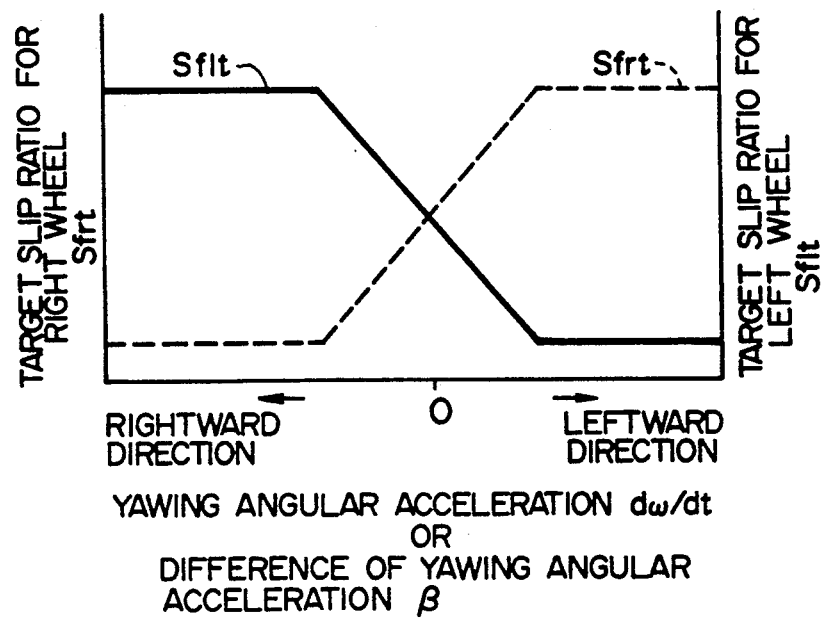

Then, based on the yawing angular acceleration difference β thus derived, target slip ratio $S_{fn}$, $S_{flt}$, $S_{rrt}$ and $S_{rlt}$ of the respective wheels are derived at blocks 93, 94, 95 and 96. For these blocks 93, 94, 95 and 96, tables for deriving the target slip ratio in terms of the yawing angular acceleration difference β are provided. Practically, the table for deriving the target slip ratio is in forms illustrated in FIGS. 2A and 2B.

In blocks 97a to 97d, based on a predicted vehicle speed V, the target slip ratio $S_{fn}$, $S_{flt}$, $S_{rrt}$ and $S_{rlt}$ and the wheel speeds $V_{fr}$, $V_{fl}$, $V_{rr}$, $V_{rl}$, target wheel speeds $V_{fn}$, $V_{flt}$, $V_{rrt}$ and $V_{rlt}$ are calculated through the following equations:

$$V_{fn} = V \times (1 - S_{fn}) \quad (3)$$

$$V_{flt} = V \times (1 - S_{flt}) \quad (4)$$

$$V_{rrt} = V \times (1 - S_{rrt}) \quad (5)$$

$$V_{rlt} = V \times (1 - S_{rlt}) \quad (6)$$

Based on difference between the target wheel speeds $V_{fn}$, $V_{flt}$, $V_{rrt}$ and $V_{rlt}$ and the corresponding wheel speed $V_{fr}$, $V_{fl}$, $V_{rr}$, $V_{rl}$, operational modes of respective of the electromagnetic valves 5a to 5d are selected between an INCREMENT mode for increasing the brake fluid pressure, HOLD mode for maintaining the brake fluid pressure constant and RELEASE mode for decreasing the brake fluid pressure.

The operation of the blocks in FIG. 9 will be discussed in further detail. Here, discussion will be given separately for calculation up to deriving the target slip ratio for each wheel, and for calculation to derive control value for each wheel so as to achieve the target slip ratio. A flowchart of a routine for deriving the target slip ratio is illustrated in FIG. 7. In the flowchart of FIG. 7, a step 701 corresponds to the block 91, a step 92 corresponds to step 705, a step 707 corresponds to the blocks 93, 94, 95 and 96.

In the flowchart of FIG. 7, steps 701 to 703 forms a sequence of function for deriving a differentiated signal dθ/dt of a steering angular position θ. In the step 701, a signal from the steering angle sensor 8 is read out. In the step 702, the read out steering angle indicative signal is differentiated. In the step 703, the data is updated by shifting for use in the next calculation cycle.

In a step 704, a reference angular acceleration dω/dt$_T$ is derived by map look-up. The map used for deriving the reference angular acceleration dω/dt is as illustrated in the block 91 of FIG. 9 and proportional to the steering angular velocity dθ/dt$_T$. As seen from the block 91 in FIG. 9, upper limit values for both of the left and right steering directions are provided. As can be appreciated, in the step 704 (corresponding to the block 92 in FIG. 9), a rightward yawing angular acceleration signal dω/dt$_R$ proportional to the steering angular velocity, is derived when the steering operation toward right is performed, and conversely, a leftward yawing angular acceleration signal proportional the steering angular velocity is derived when the steering operation is performed toward left.

However, in the practical vehicle driving operation, the yawing angular acceleration will not be generated instantly in response to the steering operation. Therefore, an illustrated in a step 705, a delay element, such as a secondary delay element, is provided.

The target yawing angular acceleration dω/dt$_R$ thus derived is compared with the actually detected yawing angular acceleration dω/dt to obtain a difference therebetween, which difference serves as the yawing angular acceleration difference β.

Then, map look-up is performed for deriving the target slip ratio for each of the wheels in a step 707. The maps used for this process are illustrated in the blocks 93 to 96 in FIG. 9 and in FIGS. 2A and 2B. The map look-up operation is performed in terms of the target slip ratios $S_{fn}$, $S_{flt}$, $S_{rrt}$ and $S_{rlt}$. In the essence, the shown map is designed for decreasing the target slip ratio when yawing angular acceleration greater than the target yawing angular acceleration dω/dt$_R$ is generated. As a result, discussing with respect to FIG. 5, the target slip ratio for the right wheels as set in the vicinity of 0.2, is decreased to be smaller than or equal to 0.1 for making the friction coefficient μ smaller to generate yawing moment in leftward.

Figure 10:
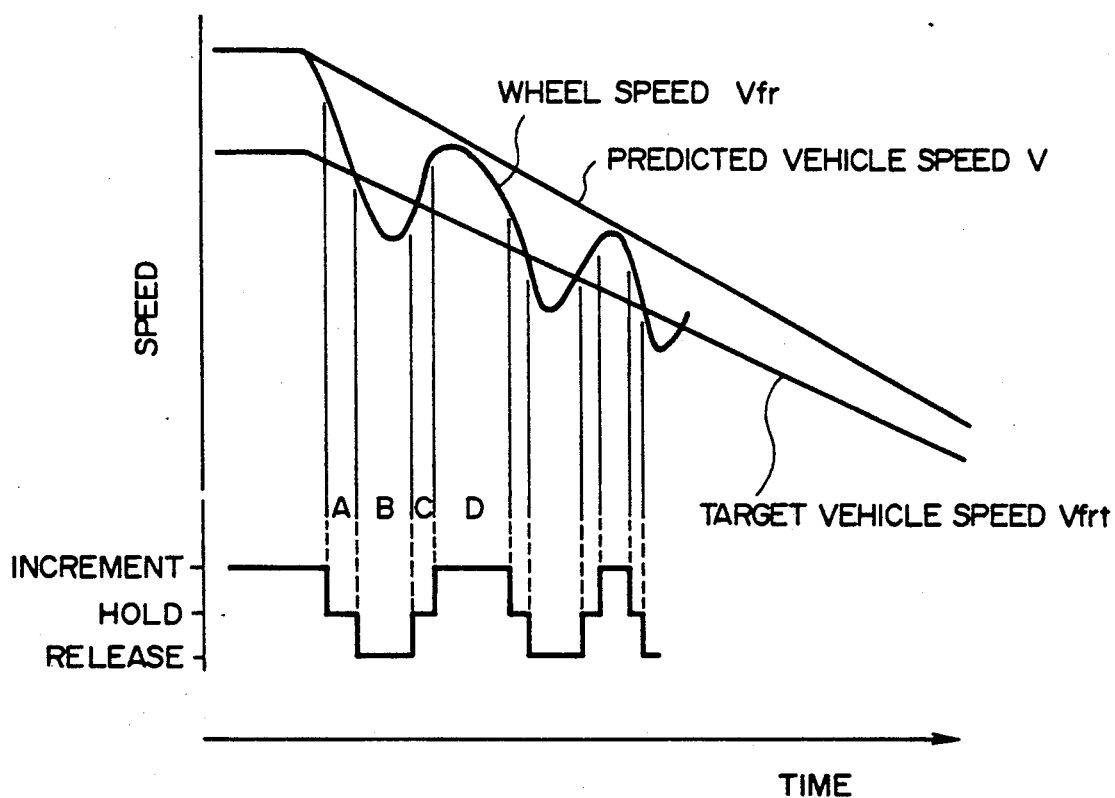
FIG. 10 is an explanatory chart showing waveform of operation of the anti-skid control system.

Next, process of control of each wheels toward the target slip ratio will be discussed. Here, detailed description will be given with respect to the front right wheel (suffix fr) with reference to FIG. 10. It should be noted that, FIG. 10 shows the control operation for controlling the wheel speed $V_{fr}$ toward the target wheel speed $V_{fn}$ which is derived by calculating the foregoing equation (3) with the target slip ratio $S_{fn}$. In addition, the signs A through D represents operational conditions of the hydraulic valve, which operational conditions are shown herebelow.

condition A: wheel acceleration $G_{fr}$ is $G_{fr} < G_L$, and thus brake fluid pressure is maintained constant, HOLD mode;

condition B: wheel speed $V_{fr}$ and the target wheel speed $V_{fn}$ are $V_{fr} < V_{fn}$, thus the brake fluid pressure is decreased, RELEASE mode;

condition C: wheel acceleration $G_{fr}$ is $G_{fr} > G_H$, and thus brake fluid pressure is maintained constant, HOLD mode; and condition D: condition is other than the foregoing conditions A through C, and thus the brake fluid pressure is increased, APPLICATION mode.

Here, in the above-mentioned condition, $G_L$ and $G_H$ represents lower reference level and upper reference level to be compared with the acceleration G.

Figure 8:
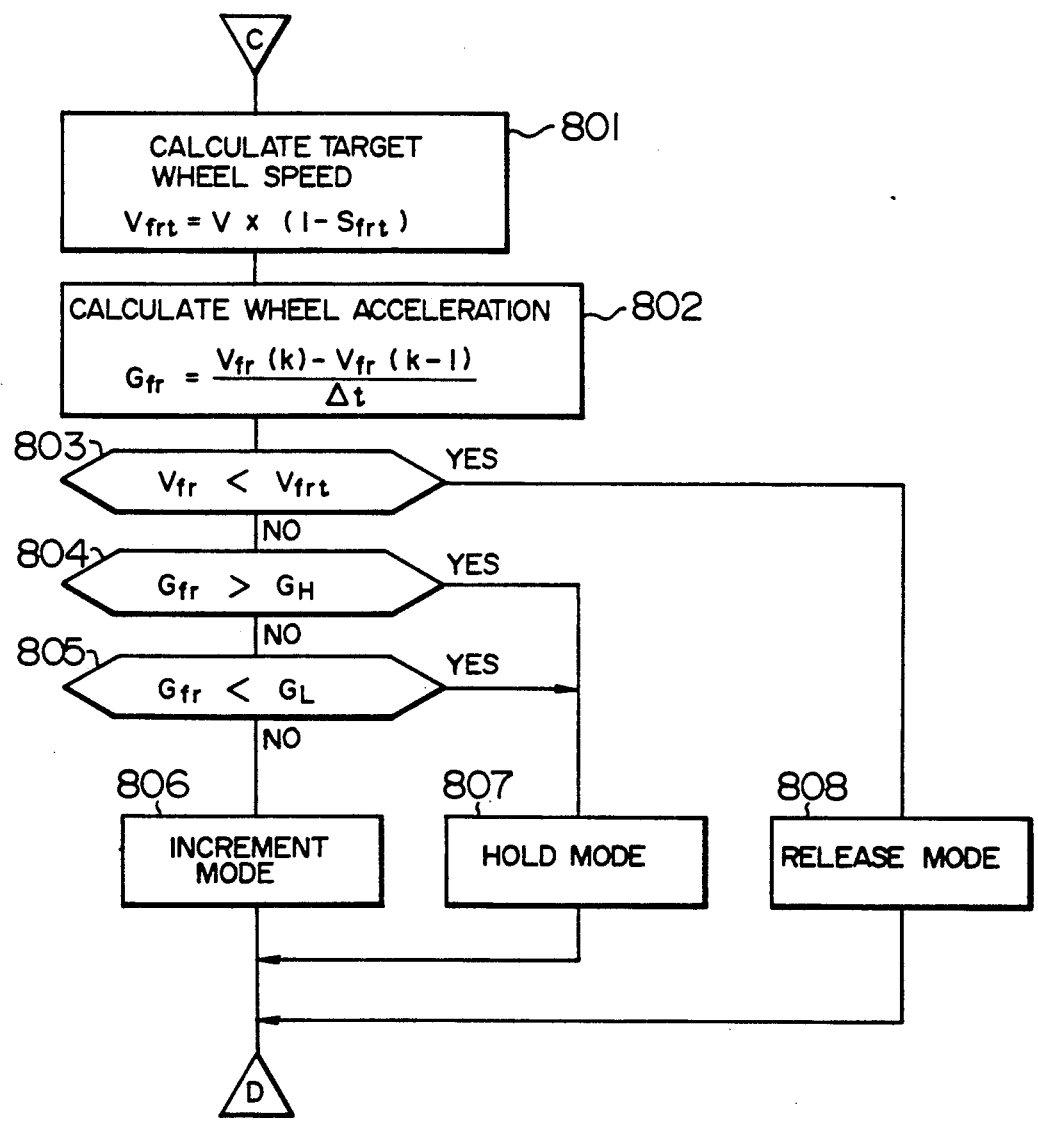
FIG. 8 is a flowchart showing process of wheel speed control.

The control process according to the foregoing conditions is illustrated in FIG. 8. It should be noted that, in the shown embodiment, the routine shown in FIG. 8 is periodically or cyclically executed every predetermined interval Δt (e.g. 10 ms).

Initially, in a step 801, the target wheel speed is calculated. Then, in a step 802, the wheel acceleration is calculated utilizing the wheel speed $V_{fr}$ obtained in the preceding calculation cycle. In a step 803, judgement is made whether the current condition satisfies the condition B in FIG. 10. In a step 804, judgement is made whether the current condition satisfies the condition C in FIG. 10. In the further step 805, judgement is made whether the current condition satisfies the condition A in FIG. 10. If the current condition does not satisfy non of the conditions A through C, then, judgement is made that the current condition is the condition D and thus the electro-magnetic valve is operated in the INCREMENT mode for increasing the brake fluid pressure.

Figure 9:
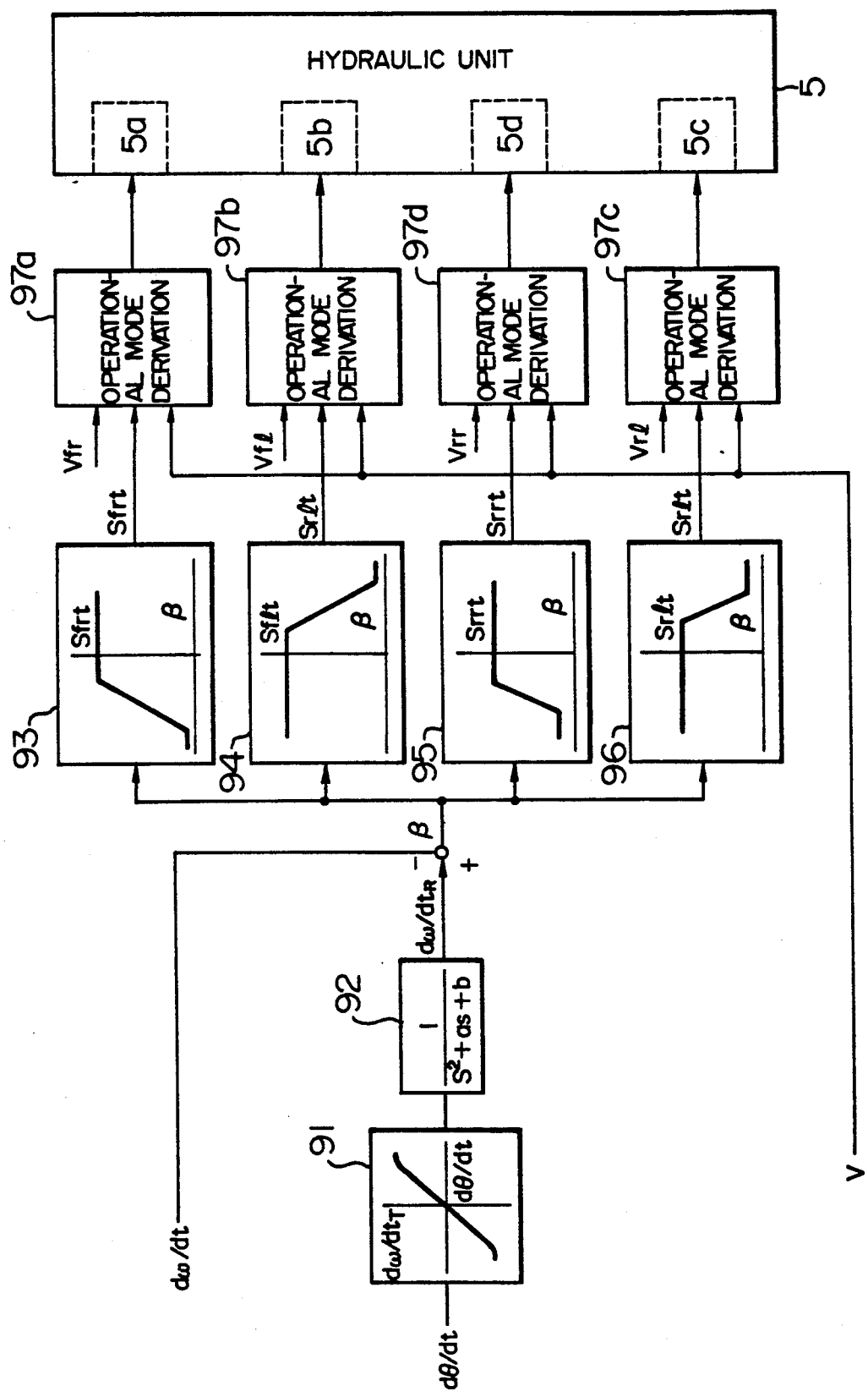
FIG. 9 is an operational block diagram showing operation of the anti-skid control system of the invention.

Although the foregoing discussion is given specifically for the front right wheel, it is obvious to perform the same or similar process in the blocks 97b to 97d of FIG. 9 to adjust the actual wheel speeds $V_{fl}$, $V_{rr}$ and $V_{rl}$ toward the target wheel speed $V_{flt}$, $V_{rrt}$ and $V_{rlt}$. As can be appreciated, the foregoing processes and calculations are performed by the microcomputer in the control unit 6.

According to the shown embodiment, while the brake is active, if excessive brake fluid pressure is built up in the wheel cylinders 2a to 2d to cause locking of the wheels 1a to 1d, the brake fluid pressure in the wheel cylinders 2a to 2d can be controlled depending upon the wheel slippage to properly or optimally control the braking force. In addition, during braking operation on the slip µ road, yawing motion which is otherwise caused due to unbalance of the braking force at the left and right wheels can be successfully canceled by varying the target slip ratio $S_{frt}$, $S_{flt}$, $S_{rrt}$ and $S_{rlt}$ for the let and right wheels derived on the basis of the detected signals. This contributes for prevention of abrupt variation of the yawing angular velocity and thus makes it possible to achieve both of the satisfactory braking performance and vehicular driving stability.

As can be clear from the discussion given hereabove, the anti-skid control system, according to the present invention, detects abrupt variation of the yawing motion of the vehicle through the yawing angular acceleration to control the slip ratio for each wheel independently of the other and thus to suppress yawing motion before growing of the yawing rate. Therefore, even on the slip µ road, it assures vehicular stability and assures optimum braking performance at the condition where abrupt variation of the yawing motion will not be caused. Therefore, the present invention is advantageous in achieving both of the braking performance and vehicular stability.

Next, the practical embodiment of a yawing acceleration detecting device employed in the anti-skid control system according to the present invention will be discusses with reference to the drawings.

As devices for detecting vehicular behavior and motion, a vibration jyrometer has been disclosed in Japanese Unexamined Patent Publication No. JP-A-64-16912, and an optical fiber jyrometer has been disclosed in Japanese Unexamined Patent Publication No. JP-A-64-1906. These are applicable in the anti-skid control system according to the invention for detecting the yawing acceleration. However, on the other hand, these jyrometer are too expensive to employ the automotive vehicle as private vehicle.

Therefore, the present invention proposes detection of the yawing acceleration by means of the acceleration sensor in relatively simple construction and low cost.

It should be noted that the above-mentioned is true even when the mounting positions of the acceleration sensors in FIG. 3A is angularly shifted by 90°.

Figure 11:
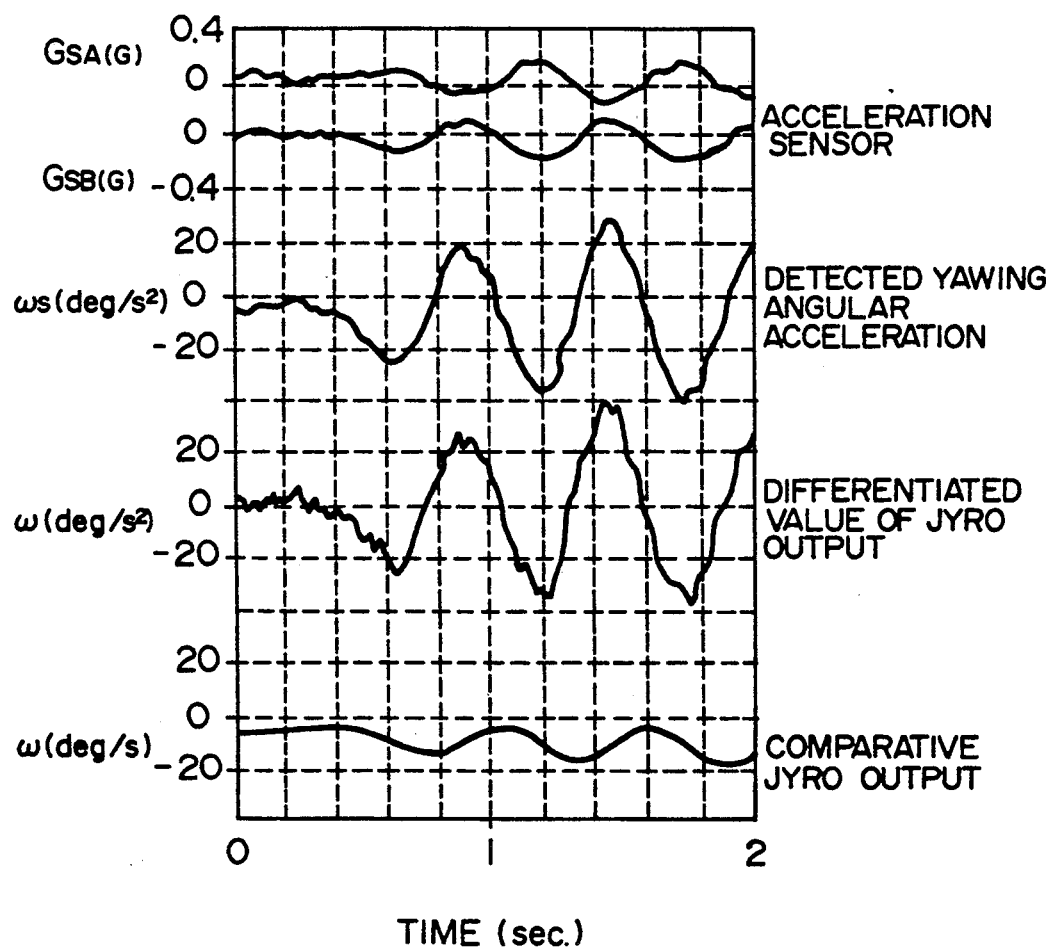
FIG. 11 is a comparative graph showing yawing angular acceleration derived based on the detected value of the acceleration sensor and the yawing angular acceleration obtained from the detected value of gyro compass.

FIGS. 3A and 3B are side elevation, plan view and back elevation showing practical arrangement of two pairs of acceleration sensors A1, A2, B1 and B2. The yawing angular acceleration derived by arranging the acceleration sensors thus arranged and through the process as set forth above, approximately coincides with a differentiated value of the detected value of the jyrometer which is illustrated in FIG. 11 for comparison.

Figure 12:
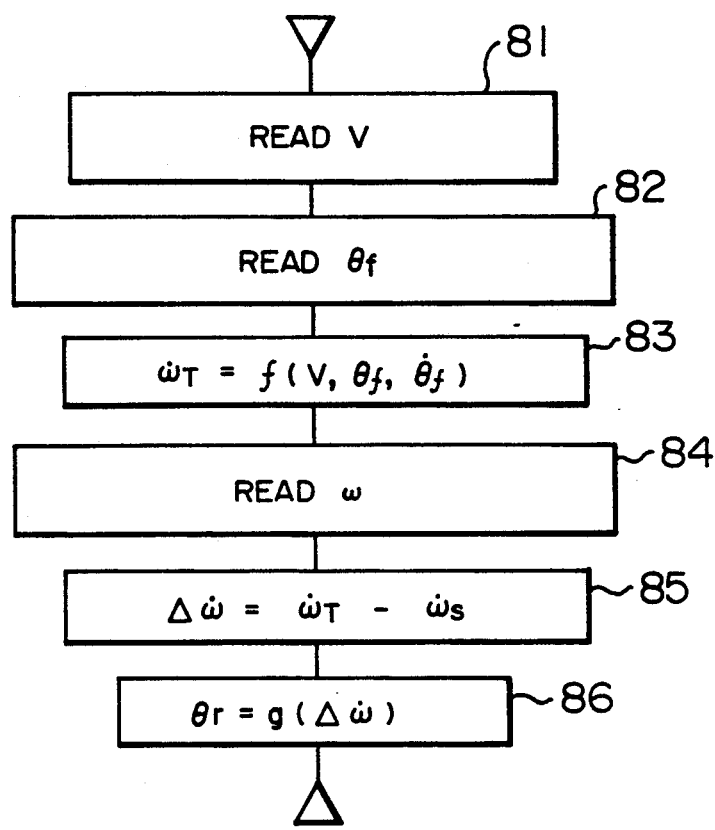
FIG. 12 is a flowchart showing process for deriving operation magnitude when the preferred embodiment of the anti-skid control system is applied for a vehicle, in which a four wheel steering (4WS) system is employed.

FIG. 12 is a flowchart showing process of derivation of operational magnitude of 4WS. The shown routine is initiated with a given time interval, e.g. 5 msec. Initially, the wheel speed sensor is read out from the wheel speed sensor (step 81). Then, at a step 82, a steering angle $\theta f$ is read out from the steering angle sensor and is converted into a digital data. At the same time, a differentiated value of the steering angle $\theta f$ is also derived. At a step 83, based on the vehicle speed v, and the steering angle $\theta f$ and the differentiated value thereof, a target yawing acceleration $\omega T$ is derived.

At a step 84, from the output value of the acceleration sensors 21a and 21b, the yawing angular acceleration $\dot\omega s$ is derived. Then, a difference $\Delta\dot\omega = \dot\omega T - \dot\omega s$ is calculated (step 85). Based on the difference $\Delta\dot\omega$ thus derived, operational magnitude $\theta r$ is derived to control the control device 2 (step 86).

Figure 13A:
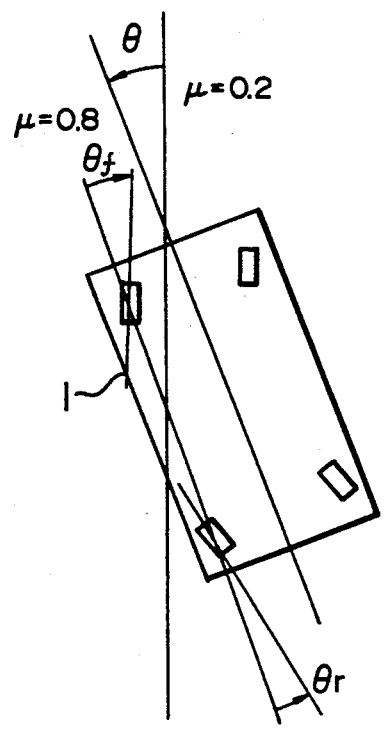
FIG. 13A is an explanatory illustration showing yawing motion if the vehicle is on a split $\mu$ road.
Figure 13B:
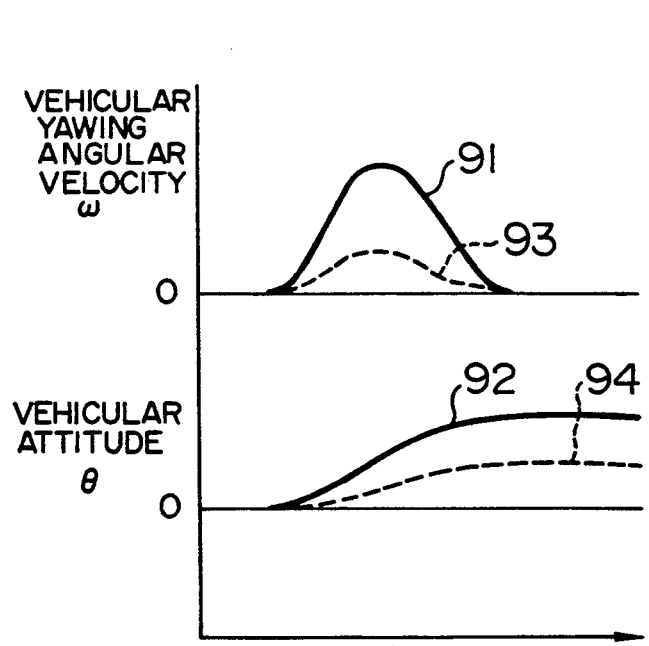
FIG. 13B is a comparative graph demonstrating effect of the shown embodiment relative to the prior art.

The effect of the control set forth above is demonstrated in FIGS. 13A and 13B. It is assumed that counterclockwise yawing motion is caused on the vehicle during the braking operation on the split µ road, as shown in FIG. 13A. The yawing angular velocity and the attitude angle of the vehicle during yawing motion in the prior art are shown by solid lines 91 and 92 in FIG. 13B. On the other hand, the yawing angular velocity and the attitude angle of the vehicle in the shown embodiment are shown by broken lines 93 and 94 in FIG. 13B.

It should be noted that although the above-mentioned embodiment detects the yawing angular acceleration to control the vehicle so that the yawing angular acceleration coincides with a target value (namely, the difference between the detected yawing angular acceleration and the target value becomes zero), it is possible to convert the yawing angular acceleration into yawing angular velocity by integration and to perform control on the basis of the yawing angular velocity. The process of control is substantially similar to that based on the yawing angular acceleration.

Next, one example of a fail-safe system for the anti-skid control system according to the invention, for performing fail-safe operation when failure is caused in the yawing angular acceleration detecting device, will be discusses with reference to the accompanying drawings.

As systems for controlling yawing motion of the vehicle, such as the automotive vehicle using the yawing rate (yawing angular velocity) and yawing angular acceleration, there is a suspension control, 4WS, ABS (anti-skid brake system), TCS (traction control system) and so forth. Such systems may face difficulty of normal control of vehicular travel when failure is caused in the sensors for detecting the yawing angular velocity or yawing angular acceleration. Therefore, Japanese Unexamined Patent Publication JP-A-1-208256 as one of the typical prior art, detects yawing rate not intended or demanded by the driver to make judgment that abnormal state of steering operation to lower the slip ratio for the front wheels to recover steering force with sacrificing braking force.

In the prior art set forth above, a problem is encountered in that, due to sacrificing of the braking force, satisfactory deceleration of the vehicle cannot be obtained despite of the fact that the braking force is maintained. This is because that the above-mentioned prior art does not directly detect the failure of the sensors and performs control detecting upon whether the unintended yawing rate is induced or not.

The shown embodiment of the fail-safe system, according to the present invention, constantly monitor the operation of the sensor for detecting the yawing rate or the yawing angular acceleration to detect failure thereof and make the yawing motion control system down in response to occurrence of failure of the sensor so as to provide satisfactorily high reliability and safety in vehicular travel.

Figure 14:
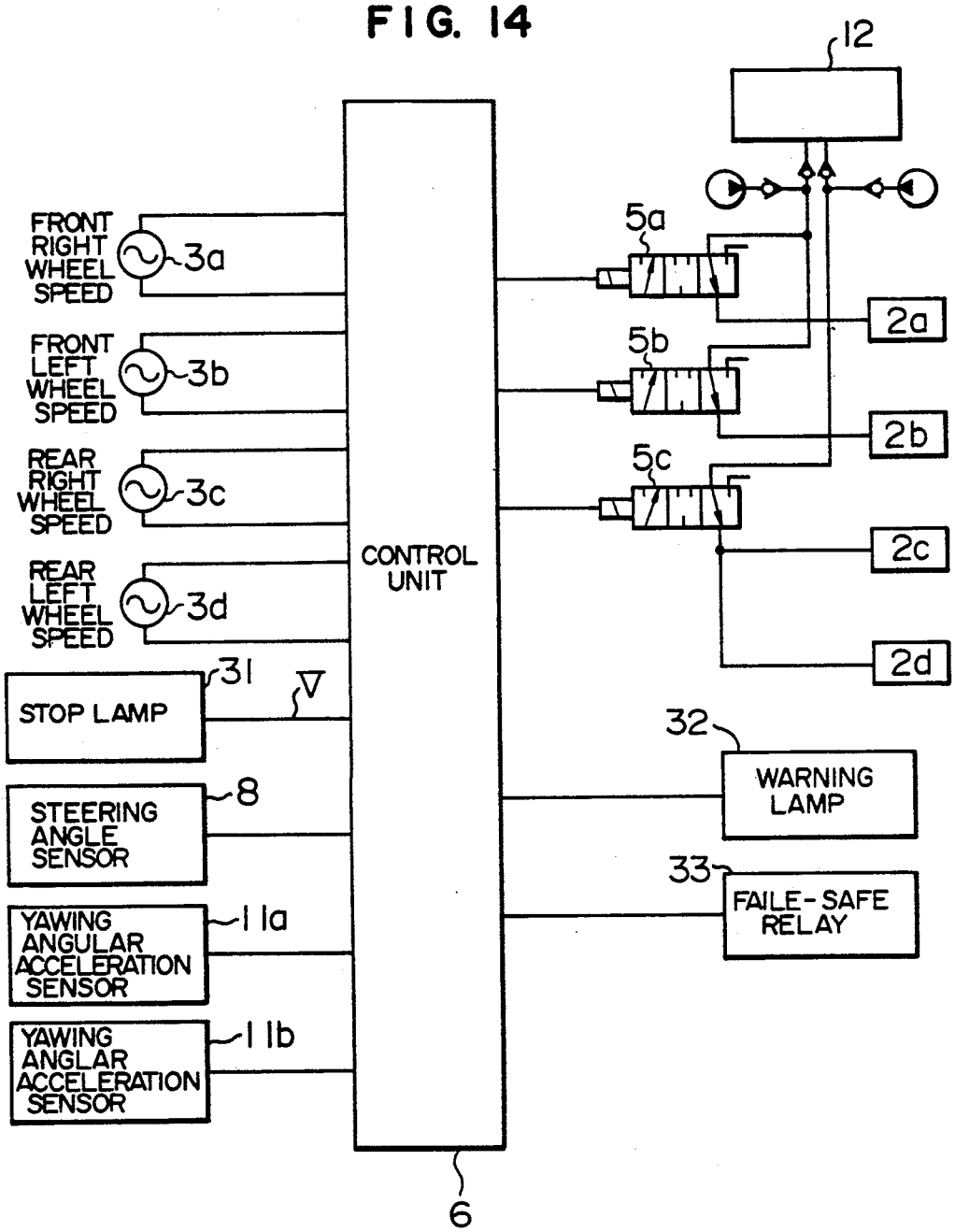
FIG. 14 is a block diagram showing input and output for a control circuit incorporating a fail-safe system.

FIG. 14 shows one embodiment of the fail-safe system with input and output construction in the control unit 6. In this embodiment, the components common to or similar to the foregoing embodiment of FIG. 1 will be represented by the same reference numerals and the detailed discussion therefor is neglected for simplification of disclosure and avoiding redundant discussion. The control unit 6 receives wheel speed data from the wheel speed sensors 3a of the front right wheel, the wheel speed sensor 3b of the front left wheel, the wheel speed sensor 3c of the rear right wheel, the wheel speed sensor 3d of the rear left wheel, the yawing angular acceleration sensors 11a and 11b, the steering angle sensor 8, a voltage V of stop lamps 31. Based on the input information, various arithmetic operations are performed to drive the three-way electromagnetic hydraulic valve 5a to 5c. When abnormality is caused in the system, an alarm or warning lamp 32 is turned on and a fail-safe relay 33 is turned on.

In the shown embodiment of the invention, utilizing the fact that the difference of the rotation speed of left and right free wheels of the two-wheel drive vehicle is proportional to the yawing rate in the state other than braking state, judgement is made whether failure of the yawing angular acceleration sensors 11a, 11b or 21a, 21b is caused. The difference of the rotation speed of the free wheels (the wheels 1a and 1b in case of the FR (front engine rear wheel drive) vehicle and the wheels 1c and 1d in case of the FF (front engine front wheel drive) vehicle is expressed as follow with taking the tread being Lt:

$$\psi^* = (Vfr - Vfl)/Lt \quad (7)$$

FIG. 15 is a flowchart showing process of detection of failure to be performed in the control unit 6 as set forth above.

Initially, at a step 521, judgement is made whether stop lamp is turned ON or not. When the stop lamp is turned ON, the process is directly goes END without performing the subsequent processes. On the other hand, when the stop lamp is held OFF, the process is advanced to a step 522 to read out the detected values Ga and Gb of the yawing angular acceleration sensors 11a and 11b. At a step 523, the yawing angular acceleration $\psi$ is expressed by:

$$\ddot{\Psi} = kl \times (Ga - Gb) \quad (8)$$

Then, at a step 524, the wheel speeds Vfr and Vfl of the free wheels are read out Based on the read out free wheel speeds Vfr and Vfl, a pseudo yawing rate $\psi^*$ is calculated through the following equation:

$$\psi^* = k2 \times (Vfr - Vfl) \quad (9)$$

Then, at a step 526, a differentiated value $\dot\psi^*$ of the pseudo yawing rate $\dot\psi$ is calculated.

Next, at a step 527, judgement is made whether the difference $|\dot\Psi - \dot\Psi^*|$ of the yawing angular acceleration $\dot\Psi$ and the pseudo yawing angular acceleration $\dot\Psi^*$ is greater than a predetermined value k3. If smaller, judgement is made that no failure is caused and the process is terminated. On the other hand, if the difference is greater than the predetermined value k3, judgement is made whether an elapsed time where the difference is maintained greater than the predetermined value k3, exceeds a predetermined period k4, at a step 528. If not exceeded, judgement is made that no failure is caused and process is terminated On the other hand, when the elapsed time exceeds the predetermined period k4, the fail-safe relay is turned OFF and the warning lamp 32 is turned ON at a step 529.

In the embodiment set forth above, failure of the yawing angular acceleration sensor can be easily and cheaply detected and thus enhance the reliability of the system.

The second embodiment of the anti-skid control system according to the invention will be explained below. The shown embodiment is differentiated from the first embodiment in employment of a yawing rate sensor in place of the yawing angular acceleration sensor 7 in FIG. 1. Acceleration sensors 11a and 11b are also deleted. On the split $\mu$ road, the yawing moment is generated due to difference of the braking forces at the left and right wheels similarly to the foregoing first embodiment, and thus yawing rate varies. This yawing rate is detected by the sensor (such as the vibration jyrometer, the optical jyrometer and so forth). When variation magnitude of the yawing rate is large, the brake fluid pressure at the wheel on the higher $\mu$ road is reduced to eliminate generation of the yawing moment. In order to enhance reliability of this system, similarly to the above-mentioned first embodiment, the projected yawing rate derived on the basis of the difference of the free wheel speeds, is constantly compared with the output of the sensor. When the difference between the projected yawing rate and the output value of the sensor is greater than a predetermined value, maintained for a period longer than a predetermined period, judgement is made that the failure is caused in the sensor to make the system down. It should be noted that it is possible to improve reliability of the anti-skid control system by employing redundant sensor system in detection of the yawing rate.

A further embodiment of the fail-safe system will be explained below. In this embodiment, the anti-skid control system employs both of the yawing angular acceleration sensors 11a and 11b and the yawing rate sensor. In this embodiment, the yawing angular accelerations detected by the yawing angular acceleration sensors 11a and 11b and a differentiated value of the yawing angular velocity detected by the yawing rate sensor are compared so that judgement is made that the failure is caused when the difference greater than a predetermined value is maintained for a period longer than a predetermined period, to make the system down.

As can be appreciated, in this embodiment, higher reliability is provided by employing the redundant sensor systems.

A still further embodiment of the fail-safe system will be described below. In this embodiment, the redundant sensor system is established by employing two pairs of the yawing angular acceleration sensors (four sensors in total). By employing such redundant double sensor systems, substantially high reliability can be provided. In this case, detection of failure of the sensors can be done by using the projected yawing rate derived on the basis of the difference of the free wheel speed or by providing the yawing rate sensor to use the differentiated value of the detected value thereof. Also, it is possible to derive a difference of the detected values of the two pairs of the yawing angular acceleration sensors to make judgement that the failure is caused in the sensors when the difference greater than a predetermined value is maintained for a period longer than a predetermined period. However, by employing the redundant sensor system, when failure is caused one of the sensor system, the yawing motion control can be maintained with utilizing another sensor system which does not fail to avoid possibility of suddenly disabling of the yawing motion control. Furthermore, with maintaining the yawing motion control, alarm can be given for the driver to require repair of the faulty sensor system.

As can be appreciated herefrom, the shown embodiment of the fail-safe system can enhance reliability of the yawing motion control system, such as the anti-skid control system.

What is claimed is:

1. An anti skid control system for an automotive vehicle comprising:
    means provided independently for each wheel of the vehicle, for controlling brake fluid pressure on each wheel in response to a control signal;
    means for detecting a vehicle speed and a rotation speed of said wheel and deriving slip ratio of said wheel on the basis of the detected values;
    means for detecting actual yawing angular acceleration on the vehicle;
    setting means for setting a target value of the slip ratio on the wheel based on said yawing angular acceleration for each wheel independently of the other; and
    control signal means for providing said control signal to said brake fluid pressure controlling means so as to adjust the derived slip ratio toward said target value.

2. An anti skid control system as set forth in claim 1, wherein said yawing angular acceleration detecting means includes two acceleration sensors which are provided the same acceleration detecting directions and fixedly arranged in spaced apart relationship on a common plane extending across the gravity center of the vehicle, and said yawing angular acceleration is derived on the basis of a difference of the outputs of said two acceleration sensors.

3. An anti skid control system as set forth in claim 1, which further comprises means for detecting an angular velocity of a steering angle of the vehicle, means for calculating a target yawing angular acceleration generated by steering behavior on the basis of the steering angular velocity, and said setting means includes means for setting said target value of the slip ratio on the wheel on the basis of the value of the actual yawing angular acceleration detected by said angular acceleration detecting means and said target yawing angular acceleration derived by said target yawing angular acceleration calculating means.

4. An anti skid control system as set forth in claim 1, wherein said yawing angular acceleration detecting means includes an angular velocity sensor for detecting angular velocity of the vehicle, and said yawing angular acceleration is derived by differentiating the value of the angular velocity detected by said angular velocity sensor.

5. An anti skid control system as set forth in claim 4, wherein said angular velocity sensor includes an optical fiber jyrometer.

6. An anti-skid control system as set forth in claim 4, wherein said angular velocity sensor includes a vibration jyrometer.

7. An anti-skid control system as set forth in claim 3, wherein said setting means for setting the target value of the slip ratio on the wheel sets the target values of the slip ratios of all wheels for making friction coefficients of all wheels and the road surface substantially uniform depending upon the difference between the value of said yawing angular acceleration and the value of said target yawing angular acceleration.

8. An anti-skid control system as set forth in claim 7, wherein said target value setting means includes means for storing a map indicative of the slip ratio of respective of all wheels with respect to said difference between the value of said yawing angular acceleration and the value of said target yawing angular acceleration.

9. An anti-skid control system as set forth in claim 7, wherein said map for the right side wheel is provided a characteristics for reducing said target slip ratio according to increasing of said difference between the value of said yawing angular acceleration and the value of said target yawing angular acceleration when yawing angular acceleration is exerted for right turn of the vehicle.

10. An anti-skid control system as set forth in claim 7, wherein said map for the left side wheel is provided a characteristics for reducing said target slip ratio according to increasing of said difference between the value of said yawing angular acceleration and the value of said target yawing angular acceleration when yawing angular acceleration is exerted for left turn of the vehicle.

11. An anti-skid control system as set forth in claim 1, wherein said vehicular actual yawing angular acceleration detecting means includes a pair of acceleration sensors for detecting longitudinal acceleration, which acceleration sensors being arranged on a lateral axis extending across the gravity center and in lateral symmetric positions with respect to the longitudinal axis of the vehicle, and means for outputting a difference of the outputs of said acceleration sensors as the actual yawing angular acceleration.

12. An anti-skid control system as set forth in claim 1, wherein said vehicular actual yawing angular acceleration detecting means includes a pair of acceleration sensors for detecting lateral acceleration, which acceleration sensors being arranged on a lateral axis extending across the gravity center and in lateral symmetric positions with respect to the longitudinal axis of the vehicle, and means for calculating the actual yawing angular acceleration on a basis of a difference of the outputs of said acceleration sensors.

13. An anti-skid control system as set forth in claim 1, which further comprises another yawing acceleration detecting means, means for comparing difference of the yawing angular acceleration detected by both yawing angular acceleration detecting means so as to make judgement whether said difference of the detected yawing angular acceleration exceeds a predetermined value, means for measuring an elapsed period while said difference of the detected yawing angular acceleration is held in excess of said predetermined value so as to make judgement whether the measured elapsed time exceeds a predetermined period of time, and means for giving a warning in response to judgement that said measured period exceeds said predetermined period of time.

14. An anti-skid control system as set forth in claim 1, which further comprises another yawing acceleration detecting means, means for comparing difference of the yawing angular acceleration detected by both yawing angular acceleration detecting means so as to make judgement whether said difference of the detected yawing angular acceleration exceeds a predetermined value, means for measuring an elapsed period while said difference of the detected yawing angular acceleration is held in excess of said predetermined value so as to make judgement whether the measured elapsed time exceeds a predetermined period of time and means for deactivating said control signal means in response to judgement that said measured period exceeds said predetermined period of time.

15. An anti-skid control system as set forth in claim 4, which further comprises another yawing acceleration detecting means, means for comparing difference of the yawing angular acceleration detected by both yawing angular acceleration detecting means so as to make judgement whether said difference of the detected yawing angular acceleration exceeds a predetermined value, means for measuring an elapsed period while said difference of the detected yawing angular acceleration is held in excess of said predetermined value so as to make judgement whether the measured elapsed time exceeds a predetermined period of time, and means for giving a warning in response to judgement that said measured period exceeds said predetermined period of time.

16. An anti-skid control system as set forth in claim 4, which further comprises another yawing acceleration detecting means, means for comparing difference of the yawing angular acceleration detected by both yawing angular acceleration detecting means so as to make judgement whether said difference of the detected yawing angular acceleration exceeds a predetermined value, means for measuring an elapsed period while said difference of the detected yawing angular acceleration is held in excess of said predetermined value so as to make judgement whether the measured elapsed time exceeds a predetermined period of time, and means for deactivating said control signal means in response to judgement that said measured period exceeds said predetermined period of time.

17. An anti-skid control system as set forth in claim 13, wherein said another yawing angular acceleration detecting means includes means for detecting rotation speeds of left and right free wheels of the vehicle, and means for deriving a projected yawing angular acceleration on the basis of a difference of the measured rotation speeds of the left and right free wheels.

18. An anti-skid control system as set forth in claim 14, wherein said another yawing angular acceleration detecting means includes means for detecting rotation speeds of left and right free wheels of the vehicle, and means for deriving a projected yawing angular acceleration on the basis of a difference of the measured rotation speeds of the left and right free wheels.

19. An anti-skid control system as set forth in claim 13, which includes two channels of said yawing angular acceleration detecting means, and anti-skid control is performed using said yawing angular acceleration detecting by one of said two channels, for which said means for making judgement whether the measured elapsed time exceeds the predetermined period of time makes judgement that the measured elapsed time is shorter than said predetermined period of time.

20. An anti-skid control system as set forth in claim 14, which includes two channels of said yawing angular acceleration detecting means, and anti-skid control is performed using said yawing angular acceleration detecting by one of said two channels, for which said means for making judgement whether the measured elapsed time exceeds the predetermined period of time makes judgement that the measured elapsed time is shorter than said predetermined period of time.

21. An anti skid control method for an automotive vehicle comprising the steps of:
   controlling brake fluid pressure on each wheel of the vehicle in response to a control signal by a brake fluid pressure controlling device;
   detecting a vehicle speed and a rotation speed of said wheel and deriving slip ratio on said wheel on the basis of the detected values;
   detecting actual yawing angular acceleration on the vehicle;
   setting a target value of the slip ratio on the wheel based on said yawing angular acceleration for each wheel independently of the other; and
   providing said control signal to said brake fluid pressure controlling device so as to adjust the derived slip ratio toward said target value.

* * * * *